US010826935B2

(12) United States Patent
Onut et al.

(10) Patent No.: US 10,826,935 B2
(45) Date of Patent: Nov. 3, 2020

(54) PHISHING DETECTION THROUGH SECURE TESTING IMPLEMENTATION (71) Applicant: International Business Machines Corporation, Armonk, NY (US)

(72) Inventors: Iosif Onut, Ottawa (CA); Aviv Ron, Negev Beer Sheva (IL); Avishay Bartik, Negev Beer Sheva (IL); Russell Couturier, Worcester, MA (US); Gregor von Bochmann, Ontario (CA); Guy-Vincent Jourdan, Ottawa (CA); Qian Cui, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 15/960,636

(22) Filed: Apr. 24, 2018

(65) Prior Publication Data
US 2019/0327267 A1 Oct. 24, 2019

(51) Int. Cl.
*H04L 29/06* (2006.01)
*H04L 29/08* (2006.01)
(Continued)

(52) U.S. Cl.
CPC ........ *H04L 63/1483* (2013.01); *G06F 21/554* (2013.01); *G06F 21/56* (2013.01);
(Continued)

(58) Field of Classification Search
CPC . H04L 63/1483; H04L 63/14; H04L 63/1441; H04L 63/1466; G06F 21/56; G06F 21/554
See application file for complete search history.

(56) References Cited

U.S. PATENT DOCUMENTS 7,343,626 B1 * 3/2008 Gallagher ............. G06F 21/577
  707/999.003
7,849,507 B1 * 12/2010 Bloch ............... H04L 29/12066
  726/22

(Continued)

FOREIGN PATENT DOCUMENTS

CA       2648997  A1    10/2007

OTHER PUBLICATIONS

S. Parekh, D. Parikh, S. Kotak and S. Sankhe, "A New Method for Detection of Phishing Websites: URL Detection," 2018 Second International Conference on Inventive Communication and Computational Technologies (ICICCT), Coimbatore, 2018, pp. 949-952. (Year: 2018).*

(Continued)

*Primary Examiner* — Kari L Schmidt (57) ABSTRACT

An example operation may include one or more of identifying a page of a website for phishing testing, attempting each of a Hypertext Transfer Protocol (HTTP) GET request and a HTTP Secure (HTTPS) GET request via the identified page of the website, attempting each of a HTTP POST request and a HTTPS POST request via the identified page of the website, determining if the website is a phishing website based on server responses to the attempted HTTP and HTTPS GET requests and the attempted HTTP and HTTPS POST requests received from the website, and in response to determining the website is a phishing website, outputting an indication of the determination for display on a display device.

17 Claims, 5 Drawing Sheets

(51) Int. Cl.
*G06F 21/55* (2013.01)
*G06F 21/56* (2013.01)
(52) U.S. Cl.
CPC .......... *H04L 63/14* (2013.01); *H04L 63/1441* (2013.01); *H04L 63/1466* (2013.01); *H04L 67/02* (2013.01)

(56) References Cited

U.S. PATENT DOCUMENTS

| | | | |
|---|---|---|---|
| 7,913,302 B2 | 3/2011 | Shraim et al. | |
| 8,578,482 B1* | 11/2013 | Yang | G06F 21/51 726/22 |
| 8,640,216 B2* | 1/2014 | Anderson | G06F 21/64 713/151 |
| 8,856,869 B1 | 10/2014 | Brinskelle | |
| 8,997,222 B2* | 3/2015 | Meliksetian | H04L 63/1441 380/242 |
| 9,342,620 B2* | 5/2016 | Joel | H04L 61/1511 |
| 9,578,048 B1* | 2/2017 | Hunt | H04L 63/20 |
| 9,811,248 B1* | 11/2017 | Berg | G06F 11/3006 |
| 9,906,553 B1* | 2/2018 | Ainslie | H04L 63/1475 |
| 9,948,671 B2* | 4/2018 | Perdisci | H04L 63/145 |
| 10,021,133 B1* | 7/2018 | Lakshmanan | H04L 63/1483 |
| 10,255,445 B1* | 4/2019 | Brinskelle | H04L 67/02 |
| 10,289,857 B1* | 5/2019 | Brinskelle | H04L 67/02 |
| 10,601,865 B1* | 3/2020 | Mesdaq | H04L 63/1483 |
| 10,637,676 B2* | 4/2020 | Chen | H04L 67/42 |
| 2003/0159063 A1* | 8/2003 | Apfelbaum | G06F 21/577 726/25 |
| 2006/0123464 A1* | 6/2006 | Goodman | H04L 63/1416 726/2 |
| 2006/0179315 A1* | 8/2006 | Sasage | H04L 63/1441 713/173 |
| 2006/0248009 A1* | 11/2006 | Hicks | G06Q 20/00 705/40 |
| 2006/0271781 A1* | 11/2006 | Murakawa | G06F 21/31 713/168 |
| 2007/0061573 A1* | 3/2007 | Dokuni | G06F 21/608 713/170 |
| 2007/0204341 A1* | 8/2007 | Rand | G06Q 10/107 726/22 |
| 2007/0282995 A1* | 12/2007 | Mizuno | G06F 3/1204 709/223 |
| 2008/0204796 A1* | 8/2008 | Kitamura | G06F 21/608 358/1.15 |
| 2009/0055929 A1* | 2/2009 | Lee | H04L 29/12066 726/23 |
| 2009/0077659 A1* | 3/2009 | Segawa | H04L 63/08 726/21 |
| 2009/0089859 A1* | 4/2009 | Cook | H04L 51/12 726/3 |
| 2009/0119769 A1* | 5/2009 | Ross | G06F 21/55 726/13 |
| 2009/0292925 A1* | 11/2009 | Meisel | H04L 63/1483 713/176 |
| 2009/0300768 A1* | 12/2009 | Krishnamurthy | G06F 21/552 726/26 |
| 2010/0095375 A1* | 4/2010 | Krishnamurthy | G06F 21/554 726/22 |
| 2010/0299438 A1* | 11/2010 | Zimmerman | H04N 7/17318 709/226 |
| 2012/0324094 A1* | 12/2012 | Wyatt | H04W 4/60 709/224 |
| 2013/0160120 A1* | 6/2013 | Malaviya | G06F 21/53 726/23 |
| 2014/0123295 A1* | 5/2014 | Kuykendall | G06F 21/577 726/25 |
| 2014/0237562 A1* | 8/2014 | Nandakumar | G06F 21/36 726/5 |
| 2014/0282872 A1* | 9/2014 | Hansen | H04L 63/102 726/3 |
| 2014/0317738 A1* | 10/2014 | Be'ery | H04L 63/14 726/23 |
| 2015/0163234 A1* | 6/2015 | Tal | H04L 63/145 726/1 |
| 2015/0200963 A1* | 7/2015 | Geng | G06F 21/51 726/22 |
| 2015/0326606 A1* | 11/2015 | Chen | G06F 16/9566 726/23 |
| 2016/0014122 A1* | 1/2016 | Pieczul | H04L 63/0876 726/4 |
| 2016/0119330 A1* | 4/2016 | L'Heureux | H04L 63/083 726/7 |
| 2017/0054754 A1* | 2/2017 | Saher | G06F 16/951 |
| 2017/0244737 A1* | 8/2017 | Kuperman | H04L 63/1425 |
| 2018/0139235 A1* | 5/2018 | Desai | H04L 63/1483 |
| 2018/0191778 A1* | 7/2018 | Volkov | H04L 63/1483 |
| 2018/0332079 A1* | 11/2018 | Ashley | G06F 16/951 |
| 2019/0068638 A1* | 2/2019 | Bartik | H04L 67/02 |
| 2019/0173919 A1* | 6/2019 | Irimie | G06F 21/554 |
| 2019/0245894 A1* | 8/2019 | Epple | G06F 21/56 |
| 2020/0036574 A1* | 1/2020 | Parra | H04L 43/12 |
| 2020/0067989 A1* | 2/2020 | Walter | H04L 61/6009 |
| 2020/0104488 A1* | 4/2020 | Li | G06F 16/9566 |
| 2020/0110878 A1* | 4/2020 | Hu | G06F 21/568 |
| 2020/0120107 A1* | 4/2020 | McGrew | H04L 63/1425 |
| 2020/0162484 A1* | 5/2020 | Solis Agea | G06F 21/566 |
| 2020/0186530 A1* | 6/2020 | Nandakumar | H04L 63/10 |

OTHER PUBLICATIONS

Z. Dong, A. Kapadia, J. Blythe and L. J. Camp, "Beyond the lock icon: real-time detection of phishing websites using public key certificates," 2015 APWG Symposium on Electronic Crime Research (eCrime), Barcelona, 2015, pp. 1-12. (Year: 2015).*

Benítez-Mejía, Diana Gabriela Noemí, et al. "HTTPS: a Phishing Attack in a Network." Proceedings of the 7th International Conference on Information Communication and Management. 2017, pp. 24-27. (Year: 2017).*

Soni, Pravin, Shamal Firake, and B. B. Meshram. "A phishing analysis of web based systems." Proceedings of the 2011 International Conference on Communication, Computing & Security. 2011, pp. 527-530. (Year: 2011).*

* cited by examiner

| | Protocol | Method | HTTP Support | HTTPS Support | Protocol | Method | HTTP Support | HTTPS Support | Same Domain |
|---|---|---|---|---|---|---|---|---|---|
| | | | 310 | | | | 320 | | 330 |
| Test 1 | http | GET | access | no access | http | POST | access | no access | YES |
| Test 2 | http | GET | access | access | http | POST | access | access | YES |
| Test 3 | http | GET | access | no access | http | POST | access | no access | NO |
| Test 4 | http | GET | access | access | http | POST | access | no access | NO |

PHISHING DETECTION THROUGH SECURE TESTING IMPLEMENTATION

TECHNICAL FIELD

This application generally relates to an automated process for identifying a malicious website, and more particularly, to a system that detects whether a website is a phishing site through a secure layer implementation test.

BACKGROUND

Phishing is a form of fraud by which an unauthorized (often malicious) entity attempts to obtain sensitive information such as usernames, passwords, credit card information, and other sensitive information, by disguising as a trustworthy entity in an electronic communication. The phishing process is typically carried out through email spoofing or instant messaging which distributes a message containing malicious links (websites) and attachments. Successful phishing messages are difficult to distinguish from authentic messages because they usually appear to be from a well-known entity. When a user selects a link or attachment, the user may be directed to a fake website which appears trustworthy. Even though the phishing site is a fake website it often has a look and feel of a legitimate website with the only difference being the URL. Communications purporting to be from social websites, banks, online payment processors, IT administrators, news organizations, and others, are often used to lure victims to the fake website because these communications appear to be trustworthy.

Recent attempts to deal with the growing occurrences of phishing attacks include enacted legislation, user training, public awareness, and technical security measures. For example, certain organizations such as FraudWatch International and Millersmiles have begun publishing copies of electronic messages which are purported to be examples of phishing attacks. However, these attempts have not created a significant effect on the occurrences of phishing attacks. In fact, for the most recent years on record (2015 and 2016), the number of phishing attacks was significantly greater than it has ever been. Accordingly, what is needed is a way of accurately detecting phishing sites before they are able to steal sensitive data.

SUMMARY

One example embodiment may provide a method that includes one or more of identifying a page of a website for phishing testing, attempting each of a Hypertext Transfer Protocol (HTTP) GET request and a HTTP Secure (HTTPS) GET request via the identified page of the website, attempting each of a HTTP POST request and a HTTPS POST request via the identified page of the website, determining if the website is a phishing website based on server responses to the attempted HTTP and HTTPS GET requests and the attempted HTTP and HTTPS POST requests received from the website, and in response to determining the website is a phishing website, outputting an indication of the determination for display on a display device.

Another example embodiment may provide a system that includes one or more of an output, and a processor configured to perform one or more of identify a page of a website to test for phishing, attempt each of a Hypertext Transfer Protocol (HTTP) GET request and a HTTP Secure (HTTPS) GET request via the identified page of the website, attempt each of a HTTP POST request and a HTTPS POST request via the identified page of the website, and determine if the website is a phishing website based on server responses to the attempted HTTP and HTTPS GET requests and the attempted HTTP and HTTPS POST requests received from the website, wherein, in response to the determination that the website is a phishing website, the processor is further configured to control the output to output an indication of the determination for display on a display device.

A further example embodiment may provide a non-transitory computer readable medium comprising instructions, that when read by a processor, cause the processor to perform one or more of identifying a page of a website for phishing testing, attempting each of a Hypertext Transfer Protocol (HTTP) GET request and a HTTP Secure (HTTPS) GET request via the identified page of the website, attempting each of a HTTP POST request and a HTTPS POST request via the identified page of the website, determining if the website is a phishing website based on server responses to the attempted HTTP and HTTPS GET requests and the attempted HTTP and HTTPS POST requests received from the website, and in response to determining the website is a phishing website, outputting an indication of the determination for display on a display device.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which support detection of malicious websites through secure implementation testing. For example, the system may automatically trigger a testing process when a website is detected for the first time and determine whether the website is a phishing site. The trigger can be in response to an initial detection of the website on a network such as in an email, an instant message, a web browser, or the like. The process may be performed by a web server or other device that attempts a combination of both HTTP and HTTPS requests through the website, and monitor responses to the requests to identify whether a host server of the site is actually a phishing site. When the site is determined to be a phishing site, the web server can block the site, prevent a user from accessing the site, output a warning or other notification to a display device indicating that the site is a phishing site, and the like.

Secure socket layer (SSL) is the standard technology for keeping an Internet connection secure and safeguarding any sensitive data that is being sent between two systems, preventing unauthorized users from reading and modifying any information transferred, including potential personal details. The two systems can be a server and a client (e.g., a shopping website and browser, etc.) or server to server (e.g., an application with personal identifiable information or with payroll information, etc.) SSL improves security by making sure that any data transferred between users and sites, or between two systems remain impossible to read. It uses encryption algorithms to scramble data in transit, preventing hackers from reading it as it is sent over the connection. This information could be anything sensitive or personal which can include credit card numbers and other financial information, names and addresses.

Additional definitions of terms include TLS (Transport Layer Security) which is an updated, more secure, version of SSL. TLS may also refer to security certificates as SSL because it is a more commonly used term. As an example, TLS certificates may include any of ECC, RSA and DSA encryption. Although examples may be described herein with respect to SSL, it should be appreciated that they may also apply to TLS. HTTPS (Hyper Text Transfer Protocol Secure) appears in a URL when a website is secured by an SSL certificate. The details of the certificate, including the issuing authority and the corporate name of the website owner, can be viewed by clicking on the lock symbol on the browser bar.

The instant application in one embodiment relates to an automated process for identifying a malicious website, and in another embodiment relates to a system that detects whether a website is a phishing site through a secure layer implementation test.

Figure 1A:
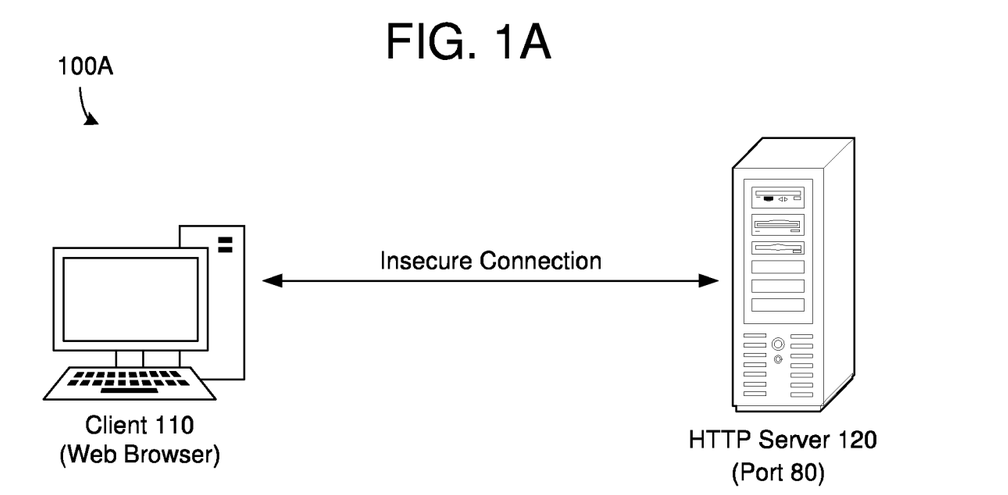
FIGS. 1A and 1B are diagrams illustrating systems for performing HTTP and HTTPS communications, respectively, according to example embodiments.
Figure 1B:
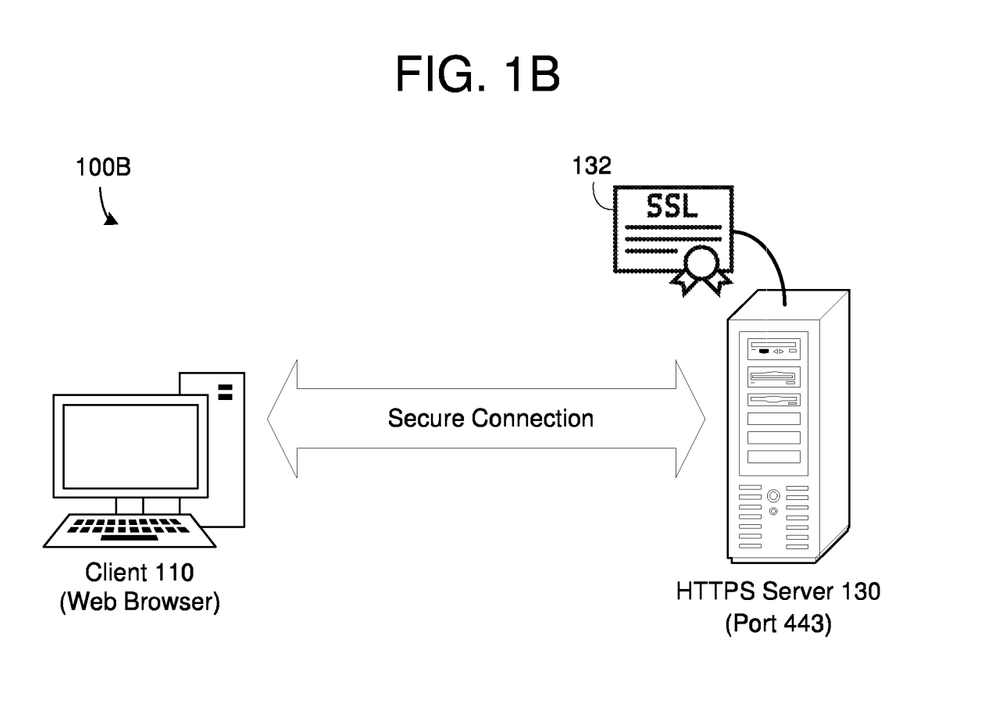

FIG. 1A illustrates a system 100A for performing HTTP communications, and FIG. 1B illustrates a system 100B for performing HTTPS communications, respectively, according to example embodiments. In both examples, the systems 100A and 100B include a client device 110 and a web server 120 (FIG. 1A) and 130 (FIG. 1B) which communicate with one another via the Internet, network, and/or the like. The client device 110 may execute a web browser which can be used to enter address information (URLs, URIs, websites, domains, etc.) for accessing web resources on the Internet. In these examples, the web servers 120 and 130 are hosts to a web resource being accessed by the client device 110.

HTTP is designed to enable communications between clients and servers. HTTP works as a request-response protocol between the client device 110 and the web server 120. In some embodiments, a web browser may be the client, and an application on a computer that hosts a website may be the server. In the example of FIG. 1, the client 110 (browser) submits an HTTP request to the server 120 via a standard HTTP channel (port 80), however, embodiments are not limited thereto. In response, the server 120 may return a response the client 110 which contains status information about the request and may also contain the requested content. Two commonly used methods for a request-response between a client and server are GET and POST. Here, the GET request may be a request for data from a specified resource while the POST request ma be a submission of data to be processed to a specified resource.

HTTPS is the secure version of HTTP and is used to securely transmit data between the client 110 and a website hosted by web server 130. In HTTPS, all communications between a browser and a website are encrypted. HTTPS is often used to protect highly confidential online transactions such as online banking and online shopping order forms. Web browsers such as INTERNET EXPLORER®, FIREFOX® and CHROME® may display an icon (e.g., a padlock, etc.) in the address bar to visually indicate that a HTTPS connection is in effect. HTTPS pages typically use one of two secure protocols to encrypt communications SSL or TLS. Both the TLS and SSL protocols use what is known as an asymmetric Public Key Infrastructure (PKI) system. An asymmetric system uses two keys to encrypt communications including a public key and a private key. Anything encrypted with the public key can only be decrypted by the private key and vice-versa. As the names suggest, the private key should be kept strictly protected and should only be accessible to the owner of the private key. In the case of a website, the private key remains securely ensconced on the web server. Conversely, the public key is intended to be distributed to anybody and everybody that needs to be able to decrypt information that was encrypted with the private key.

In FIG. 1B, the client 110 communicates with the web server 130 via a HTTPS connection. In this example, the communication channel may be via the standard HTTPS channel (port 443), however embodiments are not limited thereto. When the client 110 request a HTTPS connection to a webpage hosted by the web server 130, the server 130 of the website may initially send its SSL certificate 132 to the client 110. This certificate contains the public key needed to begin the secure session. Based on this initial exchange, the client 110 and the website then initiate an 'SSL handshake'. The SSL handshake involves the generation of shared secrets to establish a uniquely secure connection between the client 110 and the website hosted by the web server 130. In some examples, when a trusted SSL Digital Certificate is used during a HTTPS connection, the browser on the client 110 may display a padlock icon in the browser address bar. As another example, when an Extended Validation Certificate is installed on a web site, the address bar may turn green.

HTTPS is used to secure the communication between two end points (one client and one server). The establishment of a HTTPS connection ensures that no one else in the Internet can listen into the conversation as the messages that are exchanged between the two end points are encrypted. A HTTP connection is a connection between two end points (just like https) however the information exchanged between the client and the server is sent in plain text and therefore anyone that has access to the traffic can see the messages being sent. For this reason, sensitive data such as credit card information, personal information, or other sensitive information needs to be sent over HTTPS (a secured connection).

Meanwhile, to keep a minimal footprint the connection for a phishing site will usually be http because the hacker does not want to be traced. In contrast, if the hacker were to create a proper https connection it would require the hacker to register a certificate, and therefore anyone could trace the hacker's data transactions. To avoid this, just like thieves who wear gloves to prevent fingerprints from being detected by authorities, a http connection is preferred and sometimes the only option in order to avoid being traced. The example embodiments use this leverage of HTTP vs. HTTPS to identify when a phishing website exists through a unique exchange of GET and POST requests with the host server of the site under question.

Figure 3:
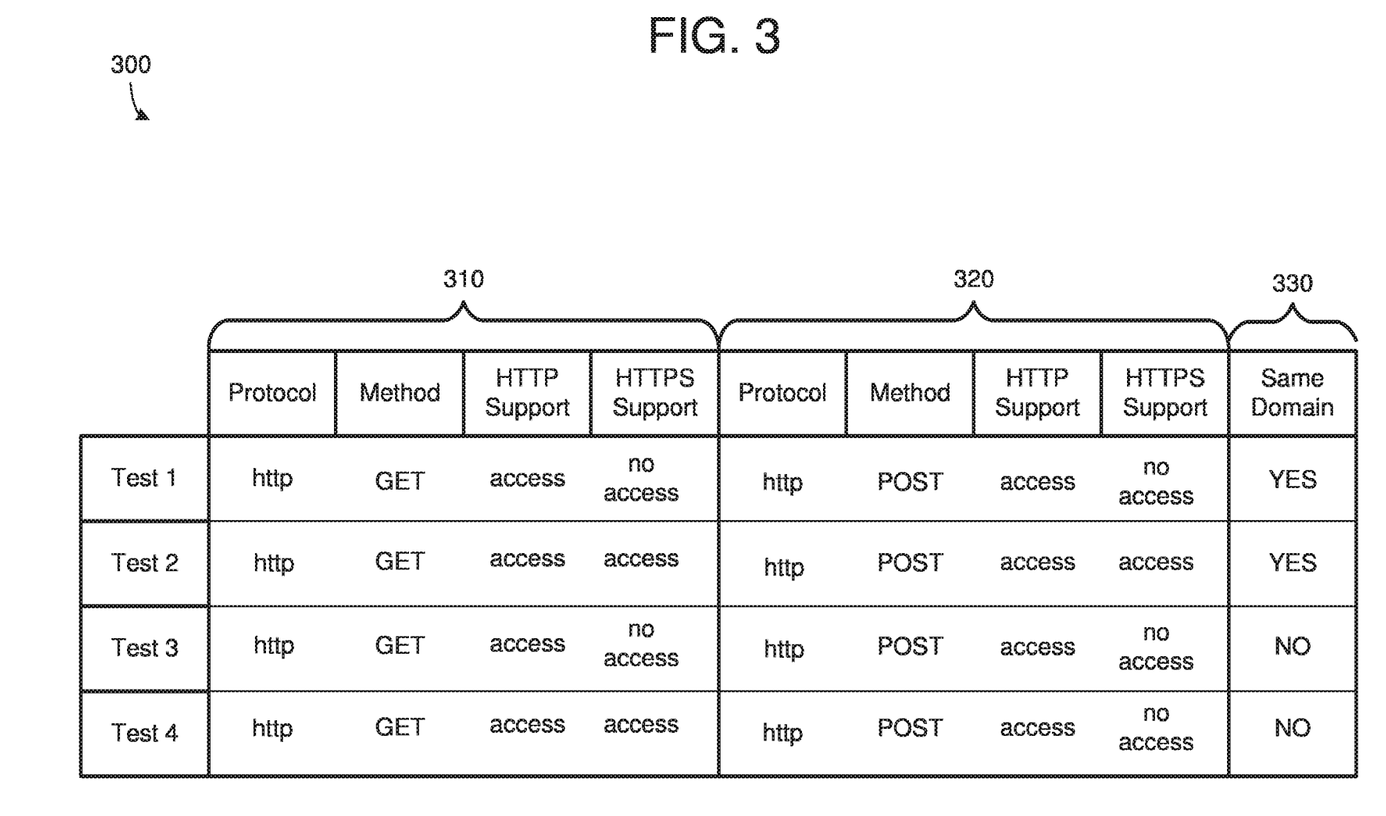
FIG. 3 is a diagram illustrating a table of testing procedures that may be iteratively implemented by the system, according to example embodiments.

A web server may iteratively perform tests based on server settings such as shown in table 300 of FIG. 3 for detecting a phishing site according to example embodiments. For example, if any test is successful (i.e., tests 1-4), the testing process may end, and the site may be determined as phishing. If, however, a test is not successful, a next test (i.e., a next iteration) may be performed with one or more access settings of the server being changed. In some cases, the test determines the site is phishing when responses are from the same domain (tests 1 and 2) while in other tests the site is determined as phishing when responses are from different domains (tests 3 and 4). In test 1 of the table 300 in FIG. 3, the server settings are set to access HTTP and not to access HTTPS. Prior to the testing, the web server identifies a web page for phishing testing. The web page may be a login page, a payment page, or some other page where information is being requested. The page may be automatically identified for example, in response to detecting a website on an organization's network for the first time such as through an email message, an instant message, an attachment, a web browser, or the like. The identification may be performed by the testing implementation program which may be running on the web server of a network which includes multiple users accessing the Internet through the web server.

There are the two basic methods to send data over the Internet in a web session. Both methods send data, the difference between the two is that the GET request includes all the requested information in the URL while the POST request has information in the body thereof. Referring again to test 1 shown in the table 300 of FIG. 3, the web server attempts to perform an HTTP GET request and an HTTPS GET request via the identified page. Here, the requests may be performed by a program operating on the web server without user interaction. The program may submit the GET requests. If the website is a phishing site, it is likely that the server hosting the phishing site is not going to be configured to support HTTPS but will be configured to support HTTP. Therefore, the server may respond to the HTTP request but may not appropriately respond to the HTTPS request or may send an error message, etc. Accordingly, in the web server may determine if the HTTP GET request was successful and the HTTPS GET request was unsuccessful.

Next, the web server attempts to perform an HTTP POST request and an HTTPS POST request via the identified page. Similar to the HTTP GET requests, the web server determines if the HTTP POST request is successful and the HTTPS POST request is unsuccessful based on server response information. If the answer is yes, the web server analyzes whether the domains (names of the server) in the server responses to both requests are the same. If the web server determines that the domains are the same in both the GET and POST responses from the server, the web server determines that the site is a phishing site.

As an example, if the URLs are from the same domain, this may indicate that one of the requests is not being switched or redirected to a different URL (e.g., URL B), while another URL (e.g., URL A) handles the other request type. In normal cases, the domains will be the same when both GET and POST work. But for the phishing situation the domains may be different when both GET and POST work because the phisher may send the information over to a completely different server in a different geography (a different domain) as another way to carry out the attack.

As shown in the table 300 of FIG. 3, during each test the web server configures different access settings. If test 1 is not successful, in other words if test 1 does not detect a phishing website, the web server may perform test 2. During test 2 the steps of the test may be repeated based on different access setting. If test 2 is not successful, the process may perform test 3 based on similar steps except the test determines the site is a phishing site when the responses are from different domains (instead of the same domain). Furthermore, if test 3 is unsuccessful then the web server may perform test 4. If none of the four tests are successful, the testing process may not reach a conclusion on whether the site is a phishing site. By modifying access settings, the web server modifies a configuration thereof to either support or not support HTTP and HTTPS, respectively. Regular (i.e., non-phishing) websites may have their servers configured to support HTTPS which means that if a client (such as the web server) were to try and access the website using HTTP (instead of HTTPS) the website will block the connection (and discard the data). In contrast, if the website is a phishing site and the client defaults on HTTP, the phishing site will not care and will accept the content regardless. By modifying access settings, the example embodiments can further evaluation a website using a more thorough approach via each iteration. Also, it should be appreciated that although GET requests and the POST requests steps of the test are described as being performed in sequential order, the steps may be repeated in a different order or simultaneously.

Figure 2:
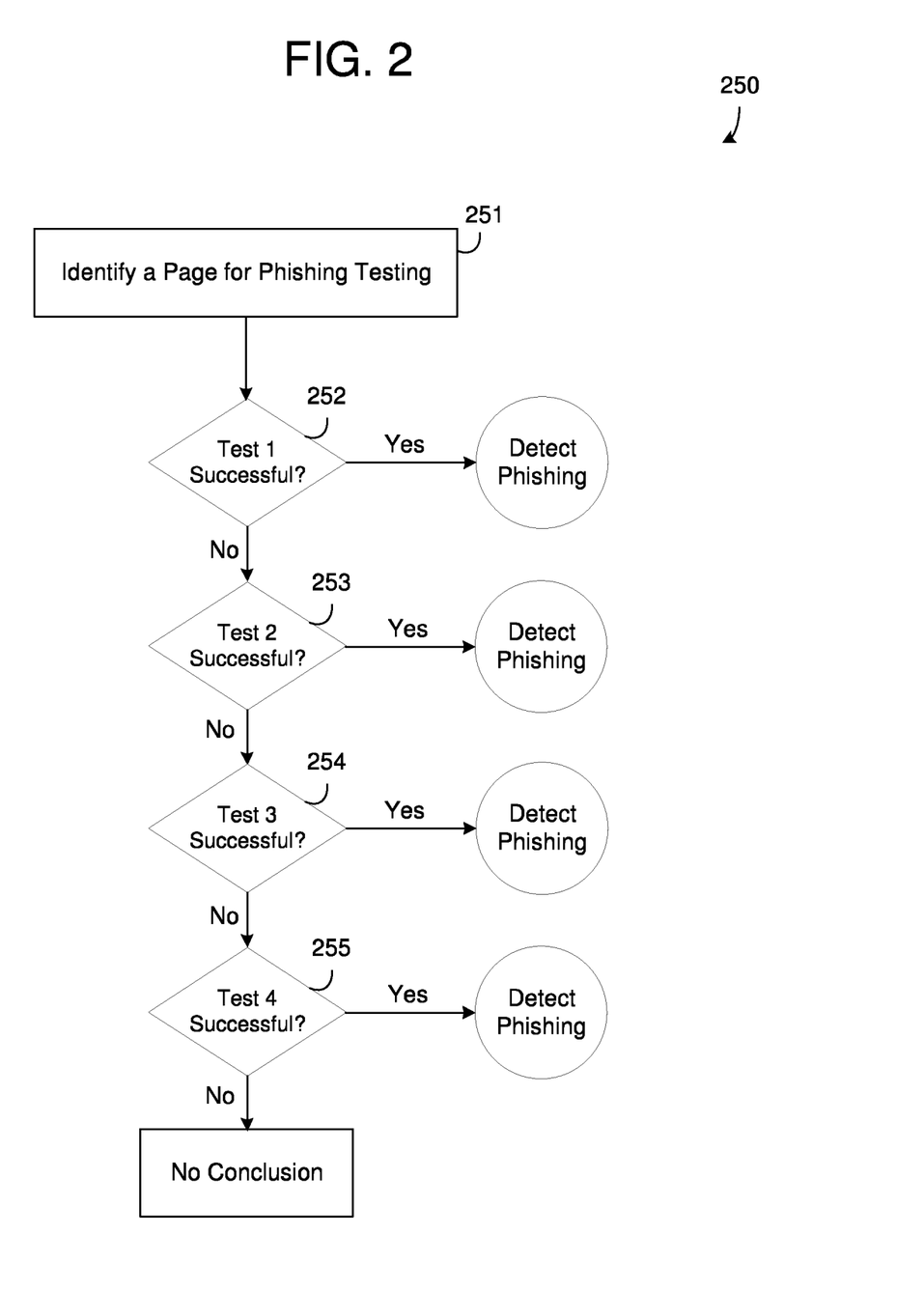
FIG. 2 is a diagram illustrating a process of detecting a phishing site according to example embodiments.

FIG. 2 illustrates a process 250 where the web server may conditionally perform multiple iterations of the phishing testing process (i.e., test 1, test 2, test 3, and test 4) during which the server performing the method is configured with different access settings during each test such as shown in the table 300 of FIG. 3. In the first test, in order to be flagged as phishing the responses need to be from the same domain, however, as shown in the table 300 of FIG. 3, there are tests (i.e. test 3 and test 4) that identify a phishing site when the responses from the phishing site are from different domains.

Referring to FIG. 2, the process 250 may iteratively perform the phishing testing by configuring different access settings during each iteration, that is, each test, and performs different determinations based on the domain until a test is successful or until all tests are performed unsuccessfully. In particular, the process 250 performs the four tests shown in the example of the table 300 in FIG. 3. In 251, the web server selects a page to be tested. Next, in 252, the web server performs test 1 based on the settings from the table 300 in which the server is configured to support HTTP but not HTTPS. If test 1 is successful, the process 250 determines the site is a phishing site and the process 250 terminates. However, if test 1 in 252 is not successful then the web server does not detect the site as phishing. Rather, in 253, the web server modifies the configurations settings so that the server supports both HTTP and HTTPS and repeats the process by performing test 2. If test 2 in 253 is successful, the site is determined as phishing and the process 250 stops. If not, in 254, the server updates configuration settings such that the server supports HTTP but does not support HTTPS. Furthermore, the server performs test 3 and changes the determination of the domains to determine if responses are from different domains. If test 3 in 254 is successful, the site is determined as phishing and the process 250 is terminated. If not, in 255, the server updates the configuration settings such that the server supports HTTP and HTTPS. In this example, test 4 is performed based on the settings and steps shown in test 4 of the table 300. If test 4 in 255 is successful, the site is determined as phishing, otherwise, the process 250 is unable to reach a conclusion about whether or not the site is phishing.

FIG. 3 illustrates a table 300 of testing procedures that may be iteratively implemented by the system, according to example embodiments. Each row in the table corresponds to a phishing test setting and procedure. If any of the tests (e.g., tests 1-4) are successful, then the system may determine that the website is a phishing site. In the example of FIG. 3, the table 300 has three procedures with settings including a first procedure 310 representing the attempting of the GET requests, a second procedure 320 representing the attempting of the POST requests, and a third procedure 330 representing a domain determination. One or more of these procedures 310, 320, and 330 may be modified during each subsequent test with respect to the previous test to check for additional alternatives and to eliminate sites that are not phishing.

In the first test (Test 1), the client web server is performing a GET request over each of HTTP and HTTPS with the HTTP settings set to access and the HTTPS settings set to no access. Similarly, for the first test, the client web server is performing a POST request over each of HTTP and HTTPS with the HTTP settings et to access and the HTTPS settings set to no access. Meanwhile, for the second test (Test 2), the server changes the HTTPS support for both the first procedure 310 and the second procedure 320 from no access to access and repeats the same tests. This process may iteratively continue with each subsequent test having a change in the access settings.

Figure 4:
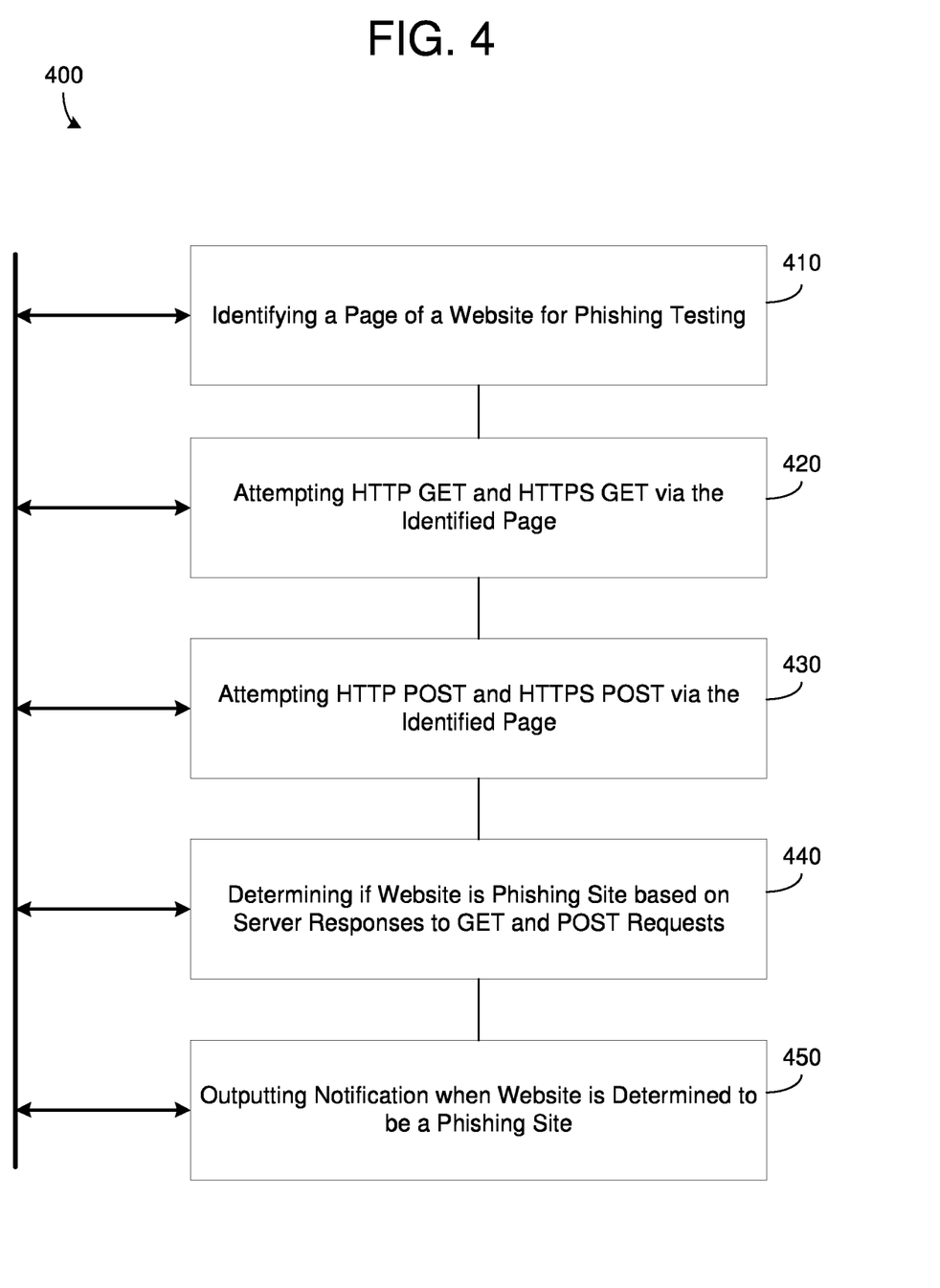
FIG. 4 is a diagram illustrating a method for testing a website through a secure implementation test, according to example embodiments.

FIG. 4 illustrates a method 400 for testing a website through a secure implementation test, according to example embodiments. For example, the method 400 may be performed by a web server which is executing a secure SSL implementation test program as described herein. As another example, the method 400 may be performed by another computing system such as a user device, a cloud platform, a database, and the like. Referring to FIG. 4, in 410, the method may include identifying a page of a website for phishing testing. For example, the identifying the page of the website may include identifying at least one of a login page and a payment page from among a plurality of web pages of the website. In some embodiments, the identifying may automatically be performed by a web server in response to detecting the website for the first time on a network such as through an email, a text message, a web browser, an attachment, a document, or the like.

In 420, the method may include attempting each of a HTTP GET request and a HTTPS GET request via the identified page of the website, and in 430, the method may include attempting each of a HTTP POST request and a HTTPS POST request via the identified page of the website. It should be appreciated that the order in which the HTTP and HTTPS GET requests in step 420 and the HTTP and HTTPS POST requests are performed in 430 is not limited to the order shown in this example. As another example, the HTTP and HTTPS POST requests may be performed prior to performing the HTTP and HTTPS GET requests. As another example, the steps 420 and 430 may be performed at the same time.

In 440, the method may include determining if the website is a phishing website based on server responses to the attempted HTTP and HTTPS GET requests and the attempted HTTP and HTTPS POST requests received from the website, and in 450, in response to determining the website is a phishing website, outputting an indication of the determination for display on a display device. In some embodiments, the method may only attempt the HTTP and HTTPS POST requests if it is determined that the HTTP GET request was successful and the HTTPS GET request was not successful. As another example, the method may only attempt the HTTP and HTTPS GET requests if it is determined the HTTP POST request was successful and the HTTPS POST requests was denied.

In some embodiments, the determining in 440 may include determining that the website is a phishing site in response to the server responses indicating the attempted HTTP GET request is successful and HTTPS GET request is not successful. In some embodiments, the determining in 440 may include determining that the website is a phishing site in response to the server responses indicating the attempted HTTP POST request is successful and HTTPS POST request is not successful. In some embodiments, the determining in 440 may include determining that the website is a phishing site in response to the server responses to each of the HTTP requests and each of the HTTPS requests coming from a same domain.

If the website is not determined to be a phishing site during a first iteration of the method, the method may be repeated after modifying access configurations. For example, the method may include, in response to not determining that the website is a phishing site, modifying HTTPS access settings of a host server performing the method and repeating the attempting of the HTTP and HTTPS GET requests and the attempting of the HTTP and HTTPS POST requests. In this example, the method may further may include determining again whether the website is a phishing site based on server responses to the attempted GET requests and the attempted POST requests performed with the modified HTTPS access settings.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
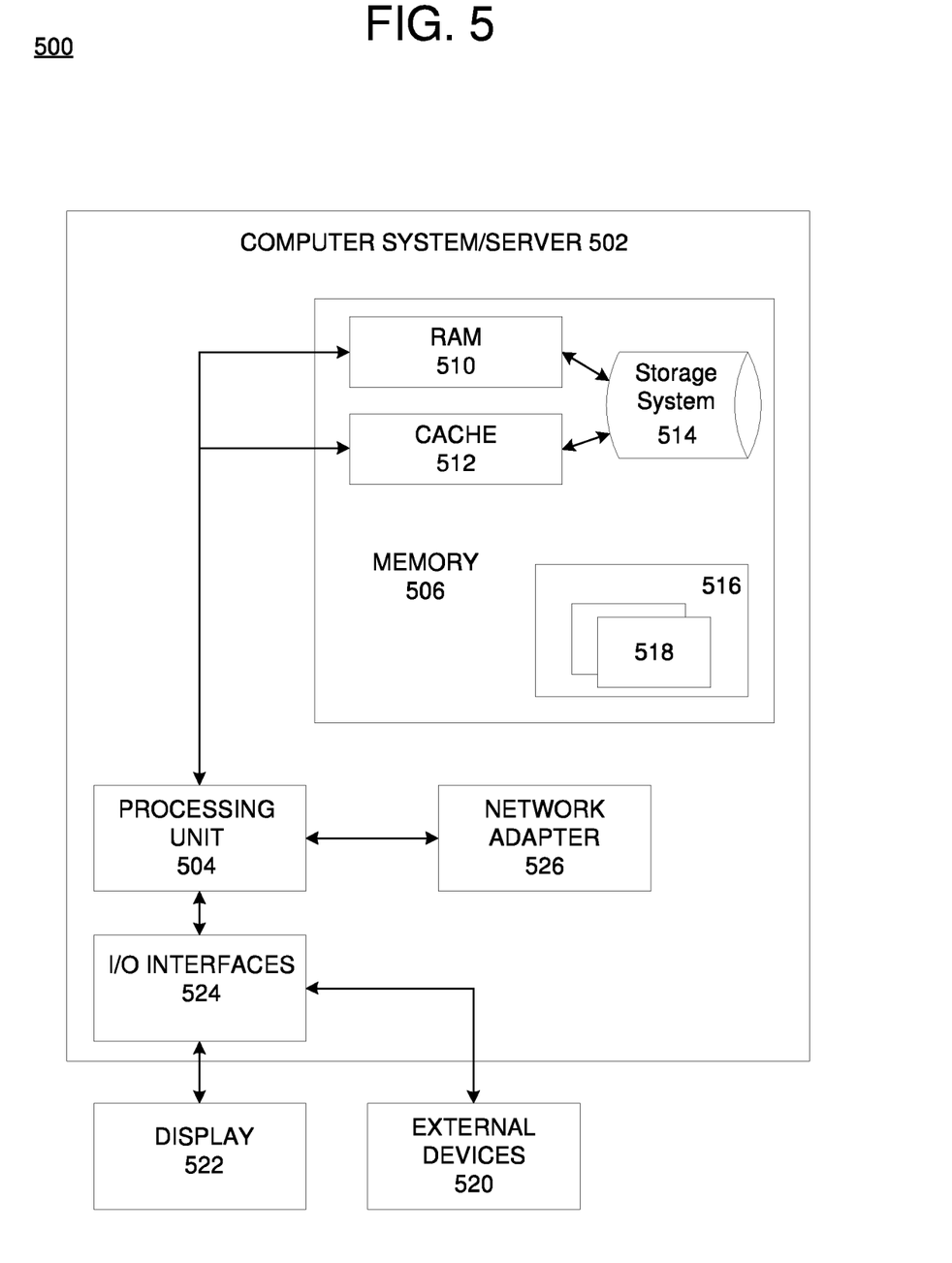
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the processor 504 may identify a page of a website to test for phishing. In response, the processor 504 may attempt each of a HTTP GET request and a HTTPS GET request via the identified page of the website and attempt each of a HTTP POST request and a HTTPS POST request via the identified page of the website. The processor 504 may determine if the website is a phishing website based on server responses to the attempted HTTP and HTTPS GET requests and the attempted HTTP and HTTPS POST requests received from the website. In response to the determination that the website is a phishing website, the processor 504 may control the output 524 to output an indication of the determination for display on a display device.

In some embodiments, the processor 504 may identify at least one of a login page and a payment page from among a plurality of web pages of the website, as the page of the website to test for phishing. Here, the processor 504 may automatically identify the page of the website to test for phishing, in response to detecting the website for a first time on a network.

In some embodiments, the processor 504 may determine that the website is a phishing site based on one or more of when the attempted HTTP GET request is successful and HTTPS GET request is not successful, when the attempted HTTP POST request is successful and HTTPS POST request is not successful, and when the server responses to each of the HTTP requests and each of the HTTPS requests are from a same domain. In some embodiments, the processor 504 may, in response to a determination that the website is not a phishing site, modify HTTPS access settings of a host server that performs the method and repeat the attempt of the HTTP and HTTPS GET requests and the attempt of the HTTP and HTTPS POST requests. In this example, the processor 504 may make another determination about whether the website is a phishing site based on server responses to the attempted GET requests and the attempted POST requests performed with the modified HTTPS access settings.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
an output; and
a hardware processor configured to
identify a page of a website to test for phishing,
attempt each of a Hypertext Transfer Protocol (HTTP) GET request and a HTTP Secure (HTTPS) GET request via the identified page of the website,
attempt each of a HTTP POST request and a HTTPS POST request via the identified page of the website,
detect that the HTTP GET and POST requests are successful and the HTTPS GET and POST requests are unsuccessful based on server responses, and
in response to the detection, determine that the website is a phishing website based on domain names within the server responses to the successful HTTP and unsuccessful HTTPS GET requests and the successful HTTP and unsuccessful HTTPS POST requests received from the website,
wherein, in response to the determination that the website is a phishing website, the hardware processor is further configured to control the output to output an indication of the determination for display on a display device.

2. The computing system of claim 1, wherein the hardware processor is configured to identify at least one of a login page and a payment page from among a plurality of web pages of the website, as the page of the website to test for phishing.

3. The computing system of claim 1, wherein the hardware processor is configured to automatically identify the page of the website to test for phishing, in response to detection of the website for a first time on a network.

4. The computing system of claim 1, wherein the hardware processor is configured to determine that the website is a phishing site when the server responses to each of the HTTP GET and HTTP POST requests are from a same domain name.

5. The computing system of claim 1, wherein the hardware processor is further configured to, in response to a determination that the website is not a phishing site, modify HTTPS access settings of a host server that performs the method and repeat the attempt of the HTTP and HTTPS GET requests and the attempt of the HTTP and HTTPS POST requests.

6. The computing system of claim 5, wherein the hardware processor is further configured to make another determination about whether the website is a phishing site based on server responses to the attempted GET requests and the attempted POST requests performed with the modified HTTPS access settings.

7. The computing system of claim 1, wherein the hardware processor is configured to determine that the website is a phishing site when the server responses to each of the HTTPS GET and HTTPS POST requests are from different domain names, respectively.

8. A method, comprising:
identifying a page of a website for phishing testing;
attempting each of a Hypertext Transfer Protocol (HTTP) GET request and a HTTP Secure (HTTPS) GET request via the identified page of the website;
attempting each of a HTTP POST request and a HTTPS POST request via the identified page of the website;
detecting that the HTTP GET and POST requests are successful and the HTTPS GET and POST requests are unsuccessful based on server responses;
in response to the detecting, determining that the website is a phishing website based on domain names within the server responses to the successful HTTP and unsuccessful HTTPS GET requests and the successful HTTP and unsuccessful HTTPS POST requests received from the website; and
in response to determining the website is a phishing website, outputting an indication of the determination for display on a display device.

9. The method of claim 8, wherein the identifying the page of the website comprises identifying at least one of a login page and a payment page from among a plurality of web pages of the website.

10. The method of claim 8, wherein the identifying is performed automatically by a web server in response to detecting the website for a first time on a network.

11. The method of claim 8, wherein the determining comprises determining that the website is a phishing site in response to the server responses to each of the HTTP GET and HTTP POST requests coming from a same domain name.

12. The method of claim 8, further comprising, in response to determining that the website is not a phishing site, modifying HTTPS access settings of a host server performing the method and repeating the attempting of the HTTP and HTTPS GET requests and the attempting of the HTTP and HTTPS POST requests.

13. The method of claim 12, further comprising determining again whether the website is a phishing site based on server responses to the attempted GET requests and the attempted POST requests performed with the modified HTTPS access settings.

14. A non-transitory computer readable medium having stored therein program instructions that, when executed by a processor, cause the processor to perform:
identifying a page of a website for phishing testing;
attempting each of a Hypertext Transfer Protocol (HTTP) GET request and a HTTP Secure (HTTPS) GET request via the identified page of the website;
attempting each of a HTTP POST request and a HTTPS POST request via the identified page of the website;
detecting that the HTTP GET and POST requests are successful and the HTTPS GET and POST requests are unsuccessful based on server responses;
in response to the detecting, determining that the website is a phishing website based on domain names within the server responses to the successful HTTP and unsuccessful HTTPS GET requests and the successful HTTP and unsuccessful HTTPS POST requests received from the website; and
in response to determining the website is a phishing website, outputting an indication of the determination for display on a display device.

15. The non-transitory computer readable medium of claim 14, wherein the determining comprises determining that the website is a phishing site in response to the server responses indicating the attempted HTTP GET request is successful and HTTPS GET request is not successful.

16. The non-transitory computer readable medium of claim 14, wherein the determining comprises determining that the website is a phishing site in response to the server responses indicating the attempted HTTP POST request is successful and HTTPS POST request is not successful.

17. The non-transitory computer readable medium of claim 14, wherein the determining comprises determining that the website is a phishing site in response to the server responses to each of the HTTP GET and HTTP POST requests coming from a same domain name.

* * * * *